(12) United States Patent
Brunet et al.

(10) Patent No.: US 10,838,549 B2
(45) Date of Patent: *Nov. 17, 2020

(54) CHANGING THE DETECTION RANGE OF A TOUCH SENSOR

(71) Applicant: Neodrón Limited, Dublin (IE)

(72) Inventors: Samuel Brunet, Cowes (GB); Richard P. Collins, Southampton (GB); Luben H. Hristov, Sofia (BG); Steinar Myren, Vikhammer (NO); Trond J. Pedersen, Trondheim (NO); Paul Stavely, Southampton (GB)

(73) Assignee: Neodrón Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,483

(22) Filed: Nov. 3, 2016

(65) Prior Publication Data

US 2017/0097735 A1 Apr. 6, 2017

Related U.S. Application Data

(63) Continuation of application No. 13/927,579, filed on Jun. 26, 2013, now Pat. No. 9,542,046.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0416* (2013.01); *G06F 2203/04108* (2013.01)

(58) Field of Classification Search
CPC ...... G06F 3/0418; G06F 3/0416; G06F 3/044; G06F 2203/04108
(Continued)

(56) References Cited

U.S. PATENT DOCUMENTS 5,117,071 A * 5/1992 Greanias ............. G06F 3/03545
345/174
7,663,607 B2 2/2010 Hotelling
(Continued)

FOREIGN PATENT DOCUMENTS

WO WO 2012/129247 9/2012

OTHER PUBLICATIONS

U.S. Appl. No. 61/454,936, filed Mar. 2011, Myers.
(Continued)

*Primary Examiner* — Amit Chatly
(74) *Attorney, Agent, or Firm* — Shami Messinger PLLC

(57) ABSTRACT

In one embodiment, a controller includes a storage unit and a processor unit. The processor unit is coupled to the storage unit and configured to receive a signal associated with an operation of a device that includes a touch sensor. The touch sensor includes a first plurality of electrodes oriented in a first direction in a first portion of the touch sensor, a second plurality of electrodes oriented in the first direction in a second portion of the touch sensor, and a third plurality of electrodes intersecting the first and second plurality of electrodes. The processor unit is further configured to determine, in response to the signal, that a detection mode of the touch sensor is to be changed and in response to the determination, couple the second plurality of electrodes to a fixed voltage source to decrease a detection range in the second portion of the touch sensor.

5 Claims, 5 Drawing Sheets

(58) Field of Classification Search
USPC .................................................. 345/173–178
See application file for complete search history.

(56) References Cited

U.S. PATENT DOCUMENTS

| | | | |
|---|---|---|---|
| 7,728,316 | B2 | 6/2010 | Fadell et al. |
| 7,864,503 | B2 | 1/2011 | Chang |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,217,902 | B2 | 7/2012 | Chang |
| 8,723,824 | B2 | 5/2014 | Myers |
| 9,542,046 | B2* | 1/2017 | Brunet .................... G06F 3/044 |
| 2008/0297487 | A1 | 12/2008 | Hotelling et al. |
| 2008/0309635 | A1 | 12/2008 | Matsuo |
| 2009/0315854 | A1 | 12/2009 | Matsuo |
| 2010/0173679 | A1* | 7/2010 | Moon ..................... H04M 1/67 |
| | | | 455/566 |
| 2010/0295559 | A1 | 11/2010 | Osoinach |
| 2011/0007021 | A1* | 1/2011 | Bernstein .............. G06F 3/0416 |
| | | | 345/174 |
| 2011/0067933 | A1* | 3/2011 | Chang ..................... G06F 3/044 |
| | | | 178/18.05 |
| 2011/0227858 | A1 | 9/2011 | An et al. |
| 2011/0260829 | A1* | 10/2011 | Lee ....................... G06F 3/0414 |
| | | | 340/5.51 |
| 2012/0188201 | A1* | 7/2012 | Binstead ................. G06F 3/041 |
| | | | 345/174 |
| 2012/0235029 | A1 | 9/2012 | Tam |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2012/0263019 | A1 | 10/2012 | Armstong-Muntner |
| 2012/0293451 | A1* | 11/2012 | Van Schyndel ....... G06F 1/1643 |
| | | | 345/174 |
| 2013/0076612 | A1 | 3/2013 | Myers |
| 2013/0076688 | A1* | 3/2013 | Tokutake ................ G06F 3/044 |
| | | | 345/174 |
| 2013/0265243 | A1* | 10/2013 | Law ...................... G06F 1/3262 |
| | | | 345/173 |

OTHER PUBLICATIONS

U.S. Appl. No. 61/454950, filed Mar. 2011, Lynch.
U.S. Appl. No. 61/454,894, filed Mar. 2011, Rothkopf.
"iPhone 4S has a Siri-specific Proximity Sensor," (1 page) http://www.tuaw.com/2011/11/09/iphone-4s-has-a-siri-specific-proximity-sensor/, Posted Nov. 9, 2011.
"Hidden features and sensors in the Samsung Galaxy S4," (2 pages) http://www.androidguys.com/2013/04/10/hidden-features-and-sensors-in-the-samsung-gallaxy-s4/, Posted Apr. 10, 2013.
S. Brunet et al., U.S. Appl. No. 13/927,579 Non-final Rejection, dated Feb. 12, 2015.
S. Brunet et al., U.S. Appl. No. 13/927,579 Response to Non-final Rejection, dated May 12, 2015.
S. Brunet et al., U.S. Appl. No. 13/927,579 Final Rejection, dated Aug. 12, 2015.
S. Brunet et al., U.S. Appl. No. 13/927,579 Response to Final Rejection, dated Oct. 13, 2015.
S. Brunet et al., U.S. Appl. No. 13/927,579 Advisory Action, dated Nov. 16, 2015.
S. Brunet et al., U.S. Appl. No. 13/927,579 Request for Continued Examination and Amendment, dated Dec. 14, 2015.
S. Brunet et al., U.S. Appl. No. 13/927,579 Non-final Rejection, dated Feb. 1, 2016.
S. Brunet et al., U.S. Appl. No. 13/927,579 Response to Non-final Rejection, dated May 2, 2016.
S. Brunet et al., U.S. Appl. No. 13/927,579 Notice of Allowance, dated Jul. 29, 2016.

\* cited by examiner

CHANGING THE DETECTION RANGE OF A TOUCH SENSOR

RELATED APPLICATION

This application is a continuation under 35 U.S.C. § 120 of U.S. application Ser. No. 13/927,579, filed Jun. 26, 2013 and entitled "Changing the Detection Range of a Touch Sensor," which is incorporated herein by reference.

TECHNICAL FIELD

This disclosure generally relates to touch sensors, and more particularly to a method for selectively changing the detection range of a touch sensor.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine the position of the change in capacitance on the touch screen.

DESCRIPTION OF EXAMPLE EMBODIMENTS

Figure 1:
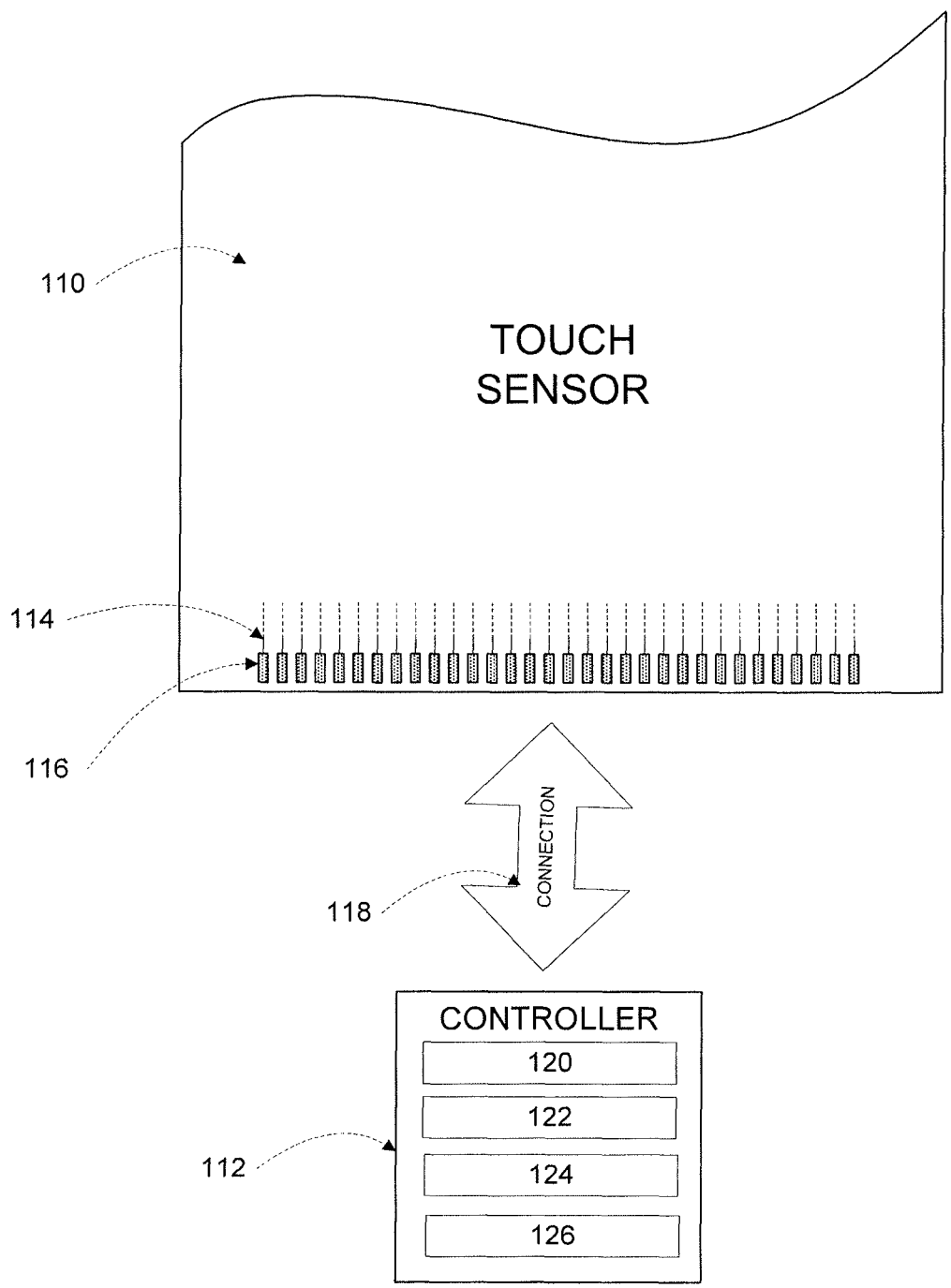
FIG. 1 illustrates an example touch sensor with an example touch-sensor controller, according to certain embodiments of the present disclosure.

Generally, a touch sensor may indicate the presence of an object near a particular area of the touch sensor. For example, if a user is making a call, the user may hold the phone near the user's ear, and the touch sensor may sense the presence of the user's ear. However, the user may hold the phone in such a way that the touch sensor also indicates the presence of the user's face. In that scenario, the user's face may accidentally activate some unwanted function of the device, such as terminating the call or muting the call. Thus, according to the teachings of the disclosure, it may be desirable to decrease sensitivity for certain areas of a touch sensor while maintaining or increasing sensitivity in other areas of the touch sensor.

In certain embodiments of a touch sensor, a touch-sensor controller may decrease sensitivity of at least portion of the touch sensor. In other embodiments, a touch-sensor controller may decrease sensitivity of some, but not all, of the touch sensor. In yet other embodiments, a touch-sensor controller may decrease sensitivity of all of the touch sensor. Decreasing sensitivity of at least a portion of the touch sensor may provide for different areas of the touch sensor with different detection ranges. For example, the touch sensor may have a longer detection range (e.g., electrical field lines are projected a greater distance from a surface and therefore more sensitivity) in an area of a device in which the user typically places its ear (or any other part of the head) while making a call and a shorter detection range (e.g., electrical field lines are projected a shorter distance from the surface and therefore less sensitivity) in an area of the device in which touch detection is unwanted, such as an area in which the user may place its cheek while making a call. As discussed above, one advantage in that example is that the shorter detection range may prevent unwanted activation of a function of the device. An advantage of the longer detection range is that the detection of an object near that area may allow the touch-sensor controller to trigger other functions of the device, such as locking the phone or dimming a backlight to save power while the user makes a call. In other words, the longer detection range allows a device to "pre-detect" an object to prepare the device for an action. In situations where a user is not making a call, it may still be advantageous to decrease sensitivity in certain portions of a touch sensor. As an example, as a user holds a device, the user often accidentally places its fingers around the edges of a touch sensor in the device. In that scenario, decreasing sensitivity in areas near the outer edges of the touch sensor may provide for a shorter detection range in those areas such that the likelihood that a user may accidentally activate functions of the device may be reduced.

Accordingly, aspects of the present disclosure include, in one embodiment, a method for changing the detection range of a touch sensor. A touch-sensor controller receives a signal associated with an operation of a device. In response to the signal, the touch-sensor controller determines that a detection mode of the device is to be changed. In response to the determination, the touch-sensor controller decreases sensitivity of a portion, but not all, of the touch sensor.

Figure 2:
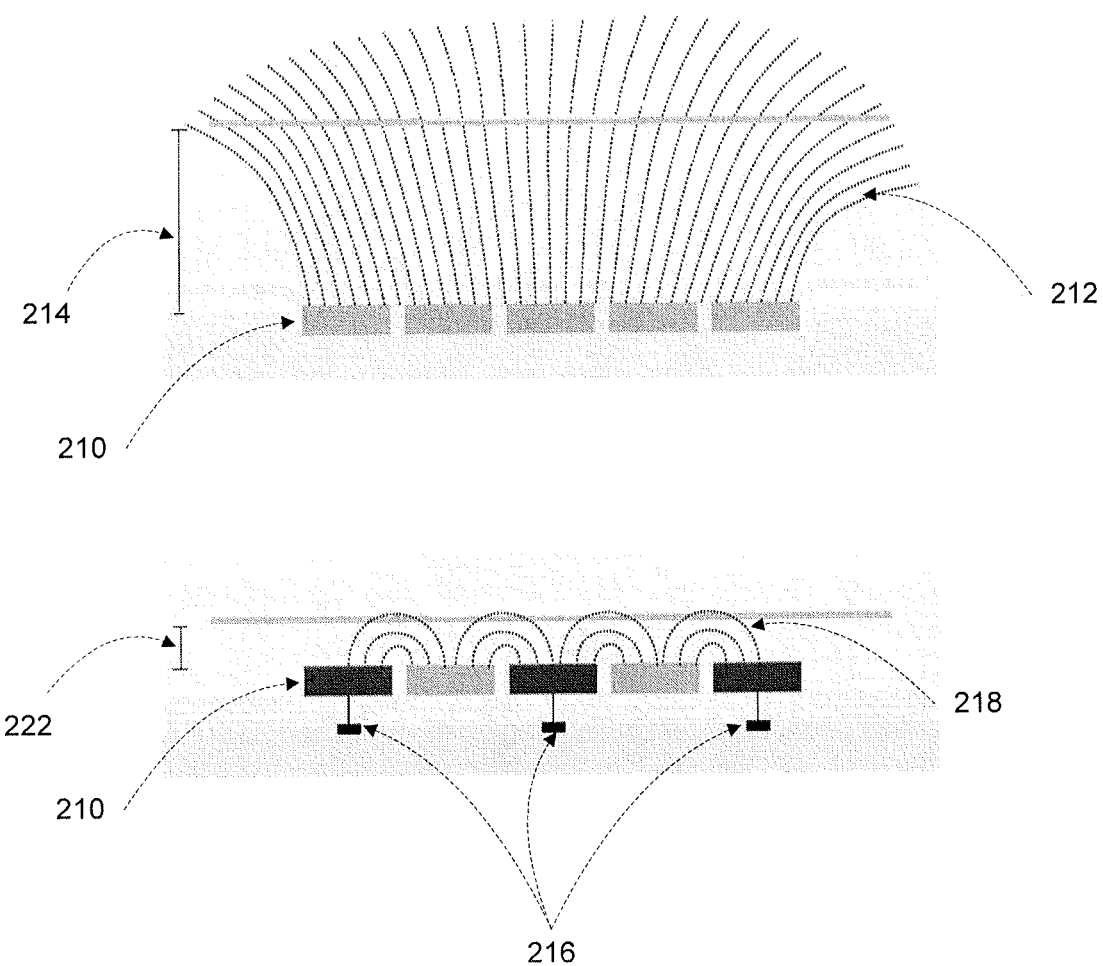
FIG. 2 illustrates electrodes of a touch sensor and an example of a change in the detection range of the touch sensor, according to certain embodiments of the present disclosure.
Figure 3:
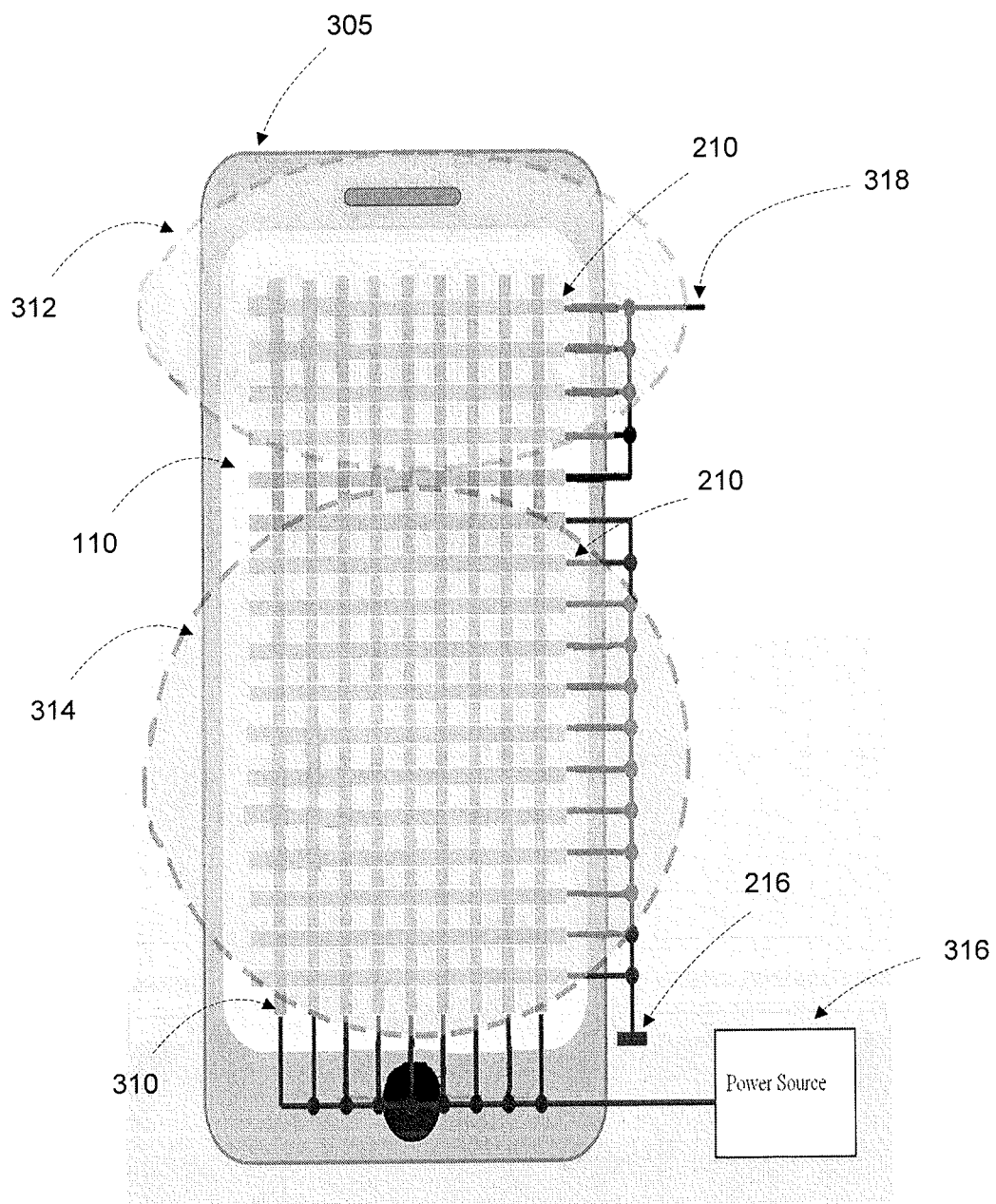
FIG. 3 is a first example layout of a device illustrating different areas of the device having different detection ranges, according to certain embodiments of the present disclosure.
Figure 4:
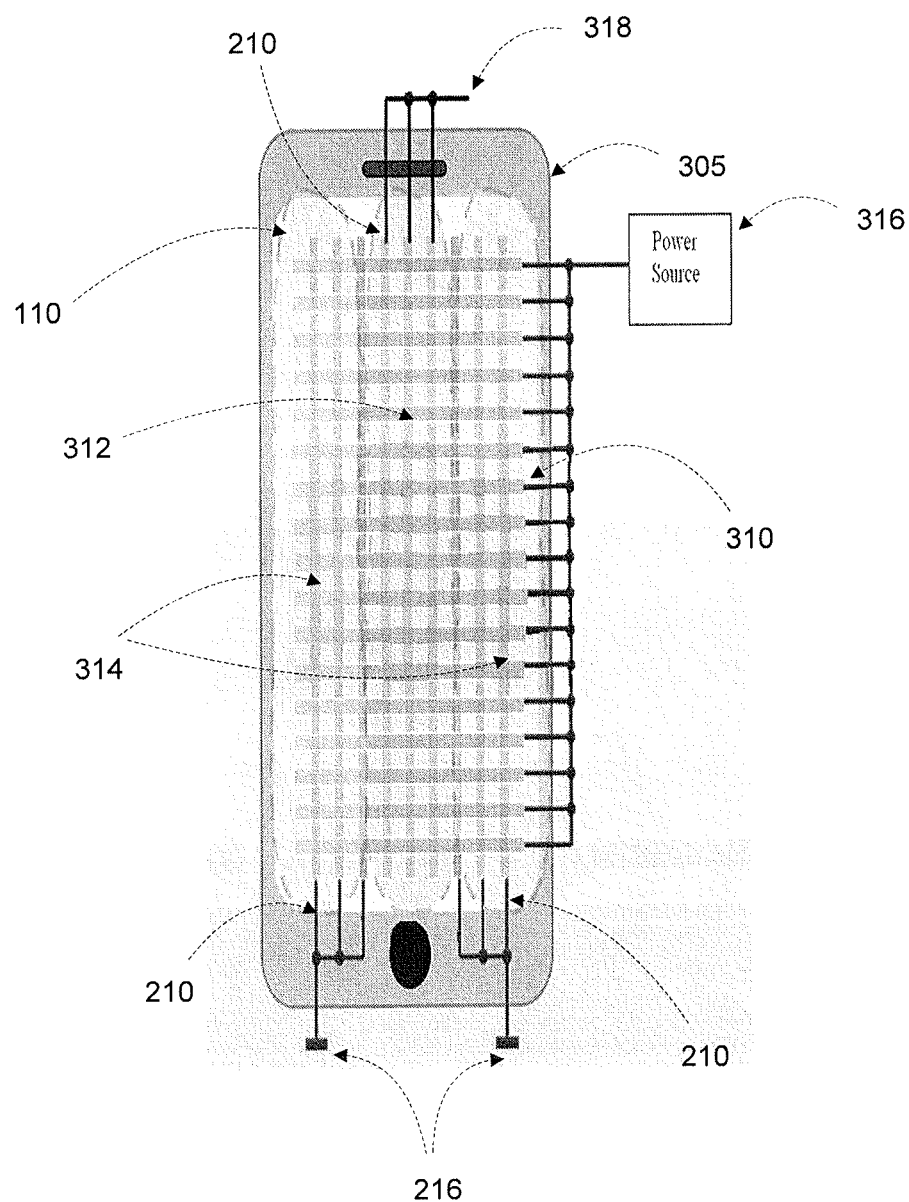
FIG. 4 is a second example layout of a device illustrating different areas of the device having different detection ranges, according to certain embodiments of the present disclosure.
Figure 5:
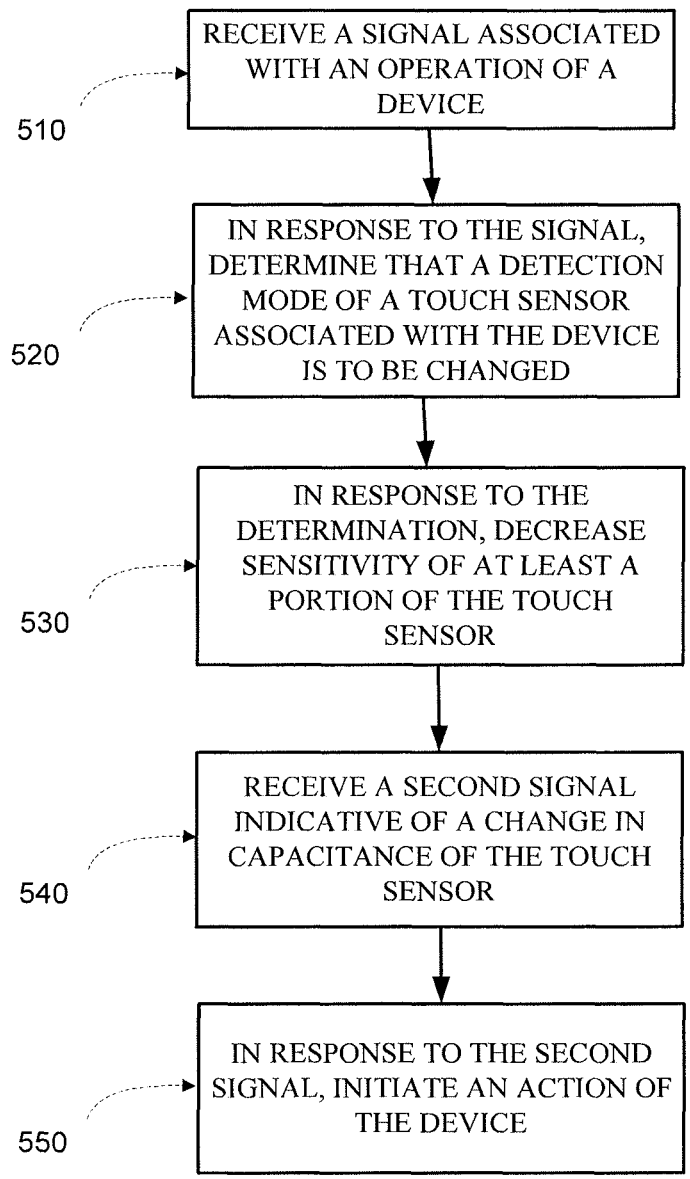
FIG. 5 is a flow chart illustrating an example method for changing the detection range of a touch sensor, according to certain embodiments of the present disclosure.

FIG. 1 shows an example touch sensor with an example touch-sensor controller. While FIG. 2 is an example of a change in the detection range of the touch sensor, FIGS. 3 and 4 illustrate two example layouts of a device with different areas of the device having different detection ranges. FIG. 5 shows an example method for changing the detection range of a touch sensor.

FIG. 1 illustrates an example touch sensor 110 with an example touch-sensor controller 112, according to certain embodiments of the present disclosure. Touch sensor 110 and touch-sensor controller 112 may detect the presence and location of a touch or the proximity of an object within a touch-sensitive area of touch sensor 110. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 110 may include one or more touch-sensitive areas, where appropriate. Touch sensor 110 may include an array of drive and sense electrodes (or an array of electrodes of a single type) disposed on One or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 110. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 110 and touch-sensor controller 112. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 110 may be made of polyethylene terephthalate (PET) or another suitable material. This disclosure contemplates any suitable substrate with any suitable portions made of any suitable material. In particular embodiments, the drive or sense electrodes in touch sensor 110 may be made of ITO in whole or in part. In particular embodiments, the drive or sense electrodes in touch sensor 110 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 110 may implement a capacitive form of touch sensing. In a mutual-capacitance implementation, touch sensor 110 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 112) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 112 may measure the change in capacitance. By measuring changes in capacitance throughout the array, touch-sensor controller 112 may determine the position of the touch or proximity within the touch-sensitive area(s) of touch sensor 110.

In a self-capacitance implementation, touch sensor 110 may include an array of electrodes of a single type that may each form a capacitive node. When an object touches or comes within proximity of the capacitive node, a change in self-capacitance may occur at the capacitive node and touch-sensor controller 112 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 112 may determine the position of the touch or proximity within the touch-sensitive area(s) of touch sensor 110. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 110 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 110 may have drive electrodes disposed in a pattern on one side of a substrate and sense electrodes disposed in a pattern on another side of the substrate. Moreover, touch sensor 110 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 110 may indicate a touch or proximity input at the position of the capacitive node. Touch-sensor controller 112 may detect and process the change in capacitance to determine the presence and location of the touch or proximity input. Touch-sensor controller 112 may then communicate information about the touch or proximity input to one or more other components (such one or more central processing units (CPUs)) of a device that includes touch sensor 110 and touch-sensor controller 112, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 112 may be one or more integrated circuits (ICs), such as for example general-purpose microprocessors, microcontrollers, programmable logic devices or arrays, application-specific ICs (ASICs). In particular embodiments, touch-sensor controller 112 comprises analog circuitry, digital logic, and digital non-volatile memory. In particular embodiments, touch-sensor controller 112 is disposed on a flexible printed circuit (FPC) bonded to the substrate of touch sensor 110, as described below. The FPC may be active or passive, where appropriate. In particular embodiments, multiple touch-sensor controllers 112 are disposed on the FPC. Touch-sensor controller 112 may include a processor unit 120, a drive unit 122, a sense unit 124, and a storage unit 126. Drive unit 122 may supply drive signals to the drive electrodes of touch sensor 110. Sense unit 124 may sense charge at the capacitive nodes of touch sensor 110 and provide measurement signals to processor unit 120 representing capacitances at the capacitive nodes. Processor unit 120 may control the supply of drive signals to the drive electrodes by drive unit 122 and process measurement signals from sense unit 124 to detect and process the presence and location of a touch or proximity input within the touch-sensitive area(s) of touch sensor 110. Processing measurement signals may include filtering, calculating gradients, and restructuring the measurement signals to more accurately represent the touch or proximity input. The processor unit may also track changes in the position of a touch or proximity input within the touch-sensitive area(s) of touch sensor 110. Storage unit 126 may store programming for execution by processor unit 120, including programming for controlling drive unit 122 to supply drive signals to the drive electrodes, programming for processing measurement signals from sense unit 124, and other suitable programming, where appropriate. Although this disclosure describes a particular touch-sensor controller having a particular implementation with particular components, this disclosure contemplates any suitable touch-sensor controller having any suitable implementation with any suitable components.

Tracks 114 of conductive material disposed on the substrate of touch sensor 110 may couple the drive or sense electrodes (such as electrodes 210 or second plurality of electrodes 310 in FIGS. 2 and 3A-3B) of touch sensor 110 to connection pads 116, also disposed on the substrate of touch sensor 110. As described below, connection pads 116 facilitate coupling of tracks 114 to touch-sensor controller 112. Tracks 114 may extend into or around (e.g. at the edges of) the touch-sensitive area(s) of touch sensor 110. Particular tracks 114 may provide drive connections for coupling touch-sensor controller 112 to drive electrodes of touch sensor 110, through which drive unit 122 of touch-sensor controller 112 may supply drive signals to the drive electrodes. Other tracks 114 may provide sense connections for coupling touch-sensor controller 112 to sense electrodes of touch sensor 110, through which sense unit 124 of touch-sensor controller 112 may sense charge at the capacitive nodes of touch sensor 110. Tracks 114 may be made of fine lines of metal or other conductive material. As an example and not by way of limitation, the conductive material of tracks 114 may be copper or copper-based and have a width of approximately 100 μm or less. As another example, the conductive material of tracks 114 may be silver or silver-based and have a width of approximately 100 μm or less. In particular embodiments, tracks 114 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 114, touch sensor 110 may include one or more ground lines terminating at a ground connector (which may be a connection pad 116) at an edge of the substrate of touch sensor 110 (similar to tracks 114).

Connection pads 116 may be located along one or more edges of the substrate, outside the touch-sensitive area(s) of touch sensor 110. As described above, touch-sensor controller 112 may be on an FPC. Connection pads 116 may be made of the same material as tracks 114 and may be bonded to the FPC using an anisotropic conductive film (ACF). Connection 118 may include conductive lines on the FPC coupling touch-sensor controller 112 to connection pads 116, in turn coupling touch-sensor controller 112 to tracks 114 and to the drive or sense electrodes of touch sensor 110. In another embodiment, connection pads 116 may be connected to an electro-mechanical connector (such as a zero insertion force wire-to-board connector); in this embodiment, connection 118 may not need to include an FPC. This disclosure contemplates any suitable connection 118 between touch-sensor controller 112 and touch sensor 110.

FIG. 2 illustrates electrodes of touch sensor 110 and an example of a change in the detection range of touch sensor 110. As discussed above, in a self-capacitance implementation, touch sensor 110 may be arranged in an array of electrodes of a single type, such as plurality of electrodes 210 illustrated in the top and bottom examples of FIG. 2. The top example of FIG. 2 illustrates a plurality of electrodes 210, which are driven simultaneously and not grounded, emitting a plurality of electrical field lines 212. The bottom example of FIG. 2 illustrates a plurality of electrodes 210, including some electrodes coupled to a fixed voltage source, with electrical field lines 218 having a decreased projection distance.

In the top example of FIG. 2, electrodes 210 emit electrical field lines 212. In an embodiment, electrodes 210 may be driven simultaneously, as illustrated in the top example of FIG. 2, which causes emission of electrical field lines 212. Electrodes 210 may not be coupled to a fixed voltage source in certain embodiments. By not connecting electrodes 210 to a fixed voltage source and driving electrodes 210 simultaneously, detection range 214 of touch sensor 110 is increased. Ordinarily, touch sensor 110 may have a detection range of one to two centimeters above the surface of the touch screen. However, in some embodiments, detection range 214 may be increased to a range of up to six centimeters. In this manner, touch sensor 110 detects objects in proximity of detection range 214, which may advantageously allow a device to initiate other actions, such as locking the screen before an actual touch occurs, waking up the device, changing the device to an alert mode, or dimming a backlight to conserve power. Electrodes 210 may be arranged as illustrated in the top example of FIG. 2 in any area of touch sensor 110 for which an increased detection range 214 is desired.

In the bottom example of FIG. 2, the distance the electrical field lines 218 are projected is decreased, which may result in touch sensor 110 having a decreased detection range 222. In other words, the sensitivity for this portion of touch sensor 110 may be reduced. In an embodiment, reducing the projection distance of electrical field lines 218 is achieved by coupling electrodes to a fixed voltage source. In certain embodiments, coupling electrodes to a fixed voltage source includes grounding the electrodes. As an example of grounding electrodes, at least one of electrodes 210 is coupled to at least one ground connector 216. As another example, every even numbered one of electrodes 210 is coupled to ground connector 216. As yet another example, every odd numbered one of electrodes 210 is coupled to ground connector 216. As yet another example, any type of coupling pattern can be used, such as coupling every third electrode to ground connector 216. In another embodiment, coupling electrodes to a fixed voltage source may include coupling the electrodes to a power supply of a microcontroller, which has a constant voltage (e.g., 0.1 volt, 3 volts, or any other constant voltage). By coupling at least one of electrodes 210 to a fixed voltage source, touch-sensor controller 112 decreases the sensitivity of touch sensor 110, which results in a decreased detection range 222. In some embodiments, the area in which electrodes are coupled to a fixed voltage source are non-sensitive. As mentioned above, touch sensor 110 may generally have a detection range of one to two centimeters above the surface of the touch screen. However, in some embodiments, coupling a plurality of electrodes to a fixed voltage source decreases the detection range to one to four millimeters. A plurality of electrodes may be coupled to a fixed voltage source in any area of touch sensor 110 for which a decreased detection range 222 is desired.

FIG. 3 is a first example layout of device 305 illustrating different areas of device 305 having different detection ranges, according to certain embodiments of the present disclosure. Device 305 may be any computing device, such as a mobile phone, a tablet, a smart phone, or a PDA. Device 305 may include touch sensor 110 for detecting objects on or in proximity to device 305. In certain embodiments, touch sensor 110 includes electrodes 210 in first area 312 of touch sensor 110 and electrodes 210 in second area 314 of touch sensor 110. Touch sensor 110 includes second plurality of electrodes 310 intersecting electrodes 210 in an embodiment. For example, electrodes 310 may be vertically oriented while electrodes 210 may be horizontally oriented. Although FIG. 3 illustrates first area 312 and second area 314 in certain portions of touch sensor 110, touch sensor 110 may have any number of areas arranged in any manner. For example, first area 312 may be arranged in a top-right portion of touch sensor 110, while second area 314 may include all other portions of touch sensor 110. Moreover, while FIG. 3 illustrates electrodes 210 and electrodes 310 in certain orientations, those electrodes may be arranged in any orientation.

Electrodes 310 are coupled to power source 316 in certain embodiments. Power source 316 may be touch-sensor controller 112 in some embodiments. In an embodiment, power source 316 may be any controllable voltage source. In that embodiment, the voltage on the output of power source 316 approximately follows the voltage on electrodes 210. In other embodiments, power source 316 may be an operational amplifier. For example, electrodes 310 may be coupled to an output of an operational amplifier. In that example, the operational amplifier may be following a voltage on the electrodes 210 in first area 312 such that a voltage on electrodes 210 in first area 312 is equipotential to a voltage on electrodes 310.

To achieve an increased sensitivity (e.g., increased detection range) in some embodiments, electrodes 210 in first area 312 are not coupled to a fixed voltage source. Electrodes 210 in first area 312 may be coupled to measuring line 318, which may communicate a signal to touch-sensor controller 112 indicative of a change in capacitance in first area 312. For example, electrodes 210 in first area 312 may sense the presence of a user's ear as the user places its head to device 305. In that example, measuring line 318 may communicate a signal indicating the change in capacitance caused by the presence of the user's ear to touch-sensor controller 112. In an embodiment, touch-sensor controller 112 may simultaneously drive electrodes 210 in first area 312, such as illustrated in the top example of FIG. 2. In some embodiments, a voltage across electrodes 210 in first area 312 may be equal to a voltage across electrodes 310 intersecting electrodes 210 in first area 312. In an embodiment, electrodes 210 in first area 312 may be coupled to an input of an operational amplifier and electrodes 310 may be coupled to an output of an operational amplifier to achieve equipotential voltages. By not coupling electrodes 210 in first area 312 to a fixed voltage source and applying approximately equipotential voltages to the intersecting electrodes in first area 312, the electrical field lines will be projected a greater distance away from touch sensor 110. In this manner, the detection range of touch sensor 110 is increased.

To achieve decreased sensitivity (e.g., decreased detection range) in second area 314 of touch sensor 110, a plurality of electrodes in second area 314 are coupled to a fixed voltage source in certain embodiments. For example, a plurality of electrodes in second area 314 may be coupled to ground connector 216. In certain embodiments, half of electrodes 210 in second area 314 may be coupled to ground connector 216, such as every even or odd electrode. As another example, electrodes in second area 314 may be coupled to a power supply of a microcontroller, which has a constant voltage source. In an embodiment, second area 214 may be non-sensitive. Because a plurality of electrodes in second area 314 are coupled to a fixed voltage source, the projection distance of the electrical field lines in this area is decreased, which decreases the detection range of touch sensor 110 for this area. Thus, decreased sensitivity may be achieved in certain areas of touch sensor 110 while increasing sensitivity in other areas of touch sensor 110.

As an example embodiment of operation, touch-sensor controller 112 may receive a signal associated with an operation of device 305. In response to the signal, touch-sensor controller 112 may determine that a detection mode of device 305 is to be changed. In response to the determination, touch-sensor controller 112 may decrease sensitivity of a portion, but not all, of touch sensor 110. To decrease sensitivity of a portion of touch sensor 110, touch-sensor controller 112 may couple a plurality of electrodes in second area 314 of touch sensor 110 to a fixed voltage source. In this manner, touch-sensor controller 112 may decrease the detection range in second area 314 of touch sensor 110. Touch-sensor controller 112 may also increase the sensitivity in first area 312 by simultaneously driving electrodes 210 in first area 312, which may not be coupled to ground connector 216. Thus, touch-sensor controller 112 may increase the detection range in first area 312 of touch sensor 110 while decreasing the detection range in second area 314.

FIG. 4 is a second example layout of device 305 illustrating different areas of device 305 having different detection ranges, according to certain embodiments of the present disclosure. In this example, the layout of device 305 includes touch sensor 110 divided into multiple areas 314 with decreased sensitivity and area 312 with increased sensitivity. Achieving decreased sensitivity in areas 314 and increased sensitivity in area 312 may be done in a manner as described above with respect to FIG. 3. For example, touch-sensor controller 112 couples a plurality of electrodes in areas 314 to a fixed voltage source, such as ground connector 216, to achieve decreased sensitivity in those areas. As discussed above, a user's fingers are often near the outer edges of device 305 when the user is holding the phone. One advantage of this example layout is that the reduced sensitivity in areas 314 may prevent a user from accidentally activating a feature of the device while holding the device.

Although FIG. 3 and FIG. 4 illustrate example layouts of device 305 having certain areas of touch sensor 110 with decreased sensitivity and certain areas with increased sensitivity, any area of touch sensor 110 may have decreased sensitivity and any area of touch sensor 110 may have increased sensitivity. For example, only the top-right portion of touch sensor 110 may have increased sensitivity, while the other portions of touch sensor 110 may have decreased sensitivity. Moreover, while FIG. 3 and FIG. 4 illustrate electrodes 210 and electrodes 310 arranged in certain orientations, any orientation of electrodes may be used.

FIG. 5 is a flow chart illustrating an example method for changing the detection range of touch sensor 110, according to certain embodiments of the present disclosure. Method 500 begins at step 510 where touch-sensor controller 112 may receive a signal associated with an operation of device 305. The operation of device 305 is a call in certain embodiments. In other embodiments, the operation of device 305 is the user playing a game on device 305. In yet other embodiments, the operation of device 305 is the user moving device 305. In still yet other embodiments, the operation of device 305 is the user holding device 305. An operation of device 305 may be a user listening to a voicemail in certain embodiments.

At step 520, touch-sensor controller 112 may determine that a detection mode of touch sensor 110 associated with device 305 is to be changed. In other embodiments, logic stored in storage unit 126 determines that a detection mode of touch sensor 110 is to be changed. Touch sensor 110 has various detection modes in certain embodiments. For example, and as discussed more fully below, one detection mode decreases sensitivity in an area corresponding to where a user may place its cheek and increase sensitivity in an area corresponding to where a user may place its ear. As another example, another detection mode decreases sensitivity in areas along edges of touch sensor 110 while increasing sensitivity in a center area of touch sensor 110. As yet another example, a detection mode increases sensitivity in the top-right portion of touch sensor 110 while decreasing sensitivity in all other areas of touch sensor 110. In that example, the portion having increased sensitivity may correspond to an area in which there may be a useful button. As still yet another example, a detection mode may either decrease sensitivity in all areas of touch sensor 110 or increase sensitivity in all areas of touch sensor 110.

Touch-sensor controller 112 may determine that the detection mode of touch sensor 110 is to be changed based on the received signal associated with an operation of device 305 in certain embodiments. In an embodiment, the received signal is associated with a phone call. In that embodiment, touch-sensor-controller 112 determines that the sensitivity in some areas of touch sensor 110 may be decreased and the sensitivity in other areas of touch sensor 110 may be increased. In other embodiments, the received signal may indicate that the user is playing a game. In that embodiment, touch-sensor controller 112 may determine that sensitivity of a certain area of touch sensor 110 may be decreased. In yet another embodiment, the received signal is associated with the user playing a voicemail. In other embodiments, the signal may be associated with any operation of the device that requires ear or face contact with the device.

At step 530, touch-sensor controller 112 decreases sensitivity of at least a portion of touch sensor 110 in an embodiment. In other embodiments, logic stored in storage unit 126 decreases sensitivity of at least a portion of touch sensor 110. In certain embodiments, touch-sensor controller 112 may decrease sensitivity of some, but not all, of touch sensor 110. Touch-sensor controller 112 may decrease sensitivity of all of touch sensor 110 in an embodiment. In an embodiment, an area of touch sensor 110 may be non-sensitive. In certain embodiments, touch-sensor controller 112 may decrease sensitivity of a portion of touch sensor 110 by coupling a plurality of electrodes in an area in which decreased sensitivity is desired to a fixed voltage source. For example, touch-sensor controller 112 may couple half of the electrodes in the selected area to ground connector 216, such as every even or odd electrode. As another example, touch-sensor controller 112 may couple every third electrode to ground connector 216 to achieve decreased sensitivity in that area of touch sensor 110. In this manner, the projection distance of the electrical field lines emitted from the electrodes will be decreased resulting in a reduced detection range in that portion of the screen.

Although portions of touch sensor 110 may have decreased sensitivity, other portions of touch sensor 110 may have increased sensitivity in certain embodiments. To achieve increased sensitivity in certain portions of touch sensor 110 while a portion of touch sensor 110 has decreased sensitivity, a first voltage may be applied to electrodes 210, which are not grounded. A second voltage may be applied to electrodes 310 intersecting electrodes 210 in the areas of touch sensor 110 where increased sensitivity is desired. In certain embodiments, the first voltage may be equal to the second voltage. To achieve equal voltages, electrodes 310 may be coupled to an operational amplifier, which may be following the voltage on electrodes 210 in certain embodiments. As a result of the equal voltages applied to electrodes 210 and third plurality of electrodes 310, and the lack of coupling to ground connectors, the detection range of touch sensor 110 in this area may be increased. For example, without increased sensitivity, a detection range of up to two centimeters above the surface of device 305 is achieved. With increased sensitivity, a detection range of up to six centimeters above the surface of device 305 is achieved. In this manner, the detection range of a portion of touch sensor 110 may be increased while simultaneously decreasing the detection range of a separate portion of touch sensor 110.

At step 540, touch-sensor controller 112 may receive a second signal indicative of a change in capacitance of touch sensor 110. In an embodiment, if the portion of touch sensor 110 having increased sensitivity detects the presence of an object, touch sensor 110 may communicate a signal to touch-sensor controller 112 that indicates a change in capacitance. As an example of operation, touch-sensor controller 112 may receive a signal from touch sensor 110 indicating the presence of a user's ear as the user places device 305 near the user's head as the user places or receives a call.

At step 550, touch-sensor controller 112, in response to the second signal, initiates an action of device 305 in an embodiment. In other embodiments, logic stored in storage unit 126 initiates an action of device 305. In an embodiment, an action of device 305 includes changing device 305 to a locked state such that a user may not activate a function of device 305 without first unlocking device 305. As an example, touch screen 110 of device 305 can be changed to a locked state to prevent accidental touches from causing an unwanted operation. In that example, while operation of touch screen 110 is locked, other operations of device 305 may not be locked, such as allowing the user to continue talking into the phone (e.g., maintaining a continuous stream of data). In other embodiments, an action of device 305 includes dimming or shutting off a backlight (or any other light) on device 305 to conserve power. For example, if a user receives a call and places device 305 near the user's ear, touch-sensor controller 112 receives a signal indicating a change in capacitance in the area near the user's ear and, in response, may turn off the backlight of device 305 to conserve power while the user is speaking. In another embodiment, an action of device 305 includes discarding reported touches on the touch screen. For example, if device 305 detects the presence of an ear area, an action of device 305 may be discarding any further reported touches, which provides the advantage of reducing the likelihood that an accidental touch will cause an unwanted operation of the device (e.g., terminating the call). In an embodiment, an action of device 305 may be any action that benefits from an indication that a user is holding the phone close to the user's ear or cheek.

Method 500 illustrates an example method for changing the detection range of a touch sensor. Modifications, additions, or omissions may be made without departing from the scope of this disclosure. Steps may be combined, modified, or deleted where appropriate, and additional steps may be added.

Certain embodiments of the invention may provide one or more technical advantages. In some embodiments, decreasing sensitivity in a portion of touch sensor 110 prevents a user from accidentally activating an unwanted function of device 305. Because sensitivity of a portion, but not all, of touch sensor 110 is decreased, the sensitivity in other portions of touch sensor 110 may be increased to initiate actions of device 305. Another advantage of certain embodiments is that any portion of the screen may be used to either decrease or increase sensitivity where appropriate. Moreover, decreasing sensitivity in certain portions of device 305 may lead to an increased battery life.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device comprising:
a touch sensor configured to operate in a detection mode and including a first plurality of electrodes oriented in a first direction in a first portion of the touch sensor, a second plurality of electrodes oriented in the first direction in a second portion of the touch sensor, and a third plurality of electrodes intersecting the first and second plurality of electrodes;
a storage unit; and
a processor unit coupled to the storage unit and configured to:
  determine that a detection mode of the touch sensor is to be changed;
  in response to determining that the detection mode of the touch sensor is to be changed, (i) couple the second plurality of electrodes to a fixed voltage source to decrease a detection range in the second portion of the touch sensor, wherein a decrease in the detection range decreases the projection of electrical field lines from the touch sensor and (ii) couple the first and the third plurality of electrodes to at least an input and an output of one amplifier respectively to drive the first and the third plurality of electrodes such that intersections between the first and third electrodes are equipotential to increase a detection range in the first portion of the touch sensor, wherein an increase in the detection range increases the projection of electrical field lines from the touch sensor;
  and
  initiate, in response to a detected change in capacitance of the touch sensor, an action of the device while continuing an operation of the device, the action comprising discarding reporting of one or more subsequent touches of the touch sensor detected while continuing the operation of the device.

2. The device of claim 1, wherein the operation is a call.

3. The device of claim 1, wherein the fixed voltage source is one from the set comprising: a ground connector; and a power supply of a microcontroller.

4. The device of claim 1, wherein the second portion comprises a first area along a first edge of the touch sensor and a second area along a second edge of the touch sensor.

5. A method comprising:
(a) performing a call operation in a device having a touch sensor;
(b) operating the touch sensor in a detection mode, the touch sensor including a first plurality of electrodes oriented in a first direction in a first portion of the touch sensor, a second plurality of electrodes oriented in the first direction in a second portion of the touch sensor, and a third plurality of electrodes intersecting the first and second plurality of electrodes;
(c) determining that a detection mode of the touch sensor is to be changed;
(d) coupling electrodes in response to determining that the detection mode of the touch sensor is to be changed including:
  (i) coupling the second plurality of electrodes to a fixed voltage source to decrease a detection range in the second portion of the touch sensor, wherein a decrease in the detection range decreases the projection of electrical field lines from the touch sensor, in response to determining that the detection mode of the touch sensor is to be changed, and
  (ii) coupling the first and the third plurality of electrodes to at least an input and an output of one amplifier respectively to drive the first and the third plurality of electrodes such that intersections between the first and third electrodes are equipotential to increase a detection range in the first portion of the touch sensor, wherein an increase in the detection range increases the projection of electrical field lines from the touch sensor; and
(e) initiating, in response to a detected change in capacitance of the touch sensor an action of the device while continuing the call operation of the device, the action comprising discarding reporting of one or more subsequent touches of the touch sensor detected while continuing the call operation of the device.

* * * * *